United States Patent [19]

Boob et al.

[11] Patent Number: 4,830,547
[45] Date of Patent: May 16, 1989

[54] RIVET MANIFOLD FEED DEVICE

[75] Inventors: Douglas J. Boob; David L. Wagner, both of Kent, Wash.

[73] Assignee: The Boeing Company, Seattle, Wash.

[21] Appl. No.: 679,304

[22] Filed: Dec. 7, 1984

[51] Int. Cl.⁴ .................................. B65G 53/40
[52] U.S. Cl. .......................... 406/74; 221/233; 221/263
[58] Field of Search .......... 406/74; 277/177; 221/95, 263, 233, 278

[56] References Cited

U.S. PATENT DOCUMENTS

| | | | |
|---|---|---|---|
| 2,647,810 | 8/1953 | McCuistion | 277/177 |
| 2,783,068 | 2/1957 | Bloom et al. | 277/177 |
| 2,896,208 | 7/1959 | Alderman et al. | 1/2 |
| 3,013,823 | 12/1961 | Schulz | 277/87 X |
| 3,030,832 | 4/1962 | Filageri et al. | 78/48 |
| 3,049,713 | 8/1962 | Dupuy et al. | 1/44.4 |
| 3,081,885 | 3/1963 | Carlzen et al. | 214/1 |
| 3,161,274 | 12/1964 | Lanz | 221/278 X |
| 3,275,191 | 9/1966 | MacDonald | 221/175 |
| 3,334,785 | 8/1967 | Grabowski et al. | 221/88 |
| 3,339,799 | 9/1967 | Spisak | 221/176 |
| 3,554,403 | 1/1971 | Ginther et al. | 221/93 |
| 3,797,709 | 3/1974 | Ivanovich | 406/74 |
| 3,883,040 | 5/1975 | Bell | 221/224 |
| 3,900,131 | 8/1975 | Ehrlich | 221/169 |
| 3,993,216 | 11/1976 | Poole | 221/93 |
| 4,134,595 | 1/1979 | Melville | 277/1 |
| 4,180,195 | 12/1979 | Caley et al. | 227/51 |
| 4,208,153 | 6/1980 | Trethewy | 406/74 |

Primary Examiner—Joseph F. Peters, Jr.
Assistant Examiner—James M. Kannofsky
Attorney, Agent, or Firm—Bruce A. Kaser

[57] ABSTRACT

A rivet manifold feed device (10) including a manifold body (12) that receives a rivet feed passageway (22). The manifold body (12) includes a plurality of rivet feed members or spools (14, 16, 18, 20), a plurality of air feed ports (84), and a plurality of rivet feed ports (82). A separate air feed port (84) and a separate rivet feed port (82) is positioned adjacent each respective feed spool. Each spool reciprocates back and forth between a first and a second position, wherein each spool includes a separate passageway (70, 72) that is in registration with the rivet feed passageway in each position. A rivet placed in one of the passageways (72) is delivered into the rivet feed passageway when a spool shifts into one of the positions and the air feed port adjacent that spool blasts the rivet downstream through the rivet feed passageway.

24 Claims, 2 Drawing Sheets

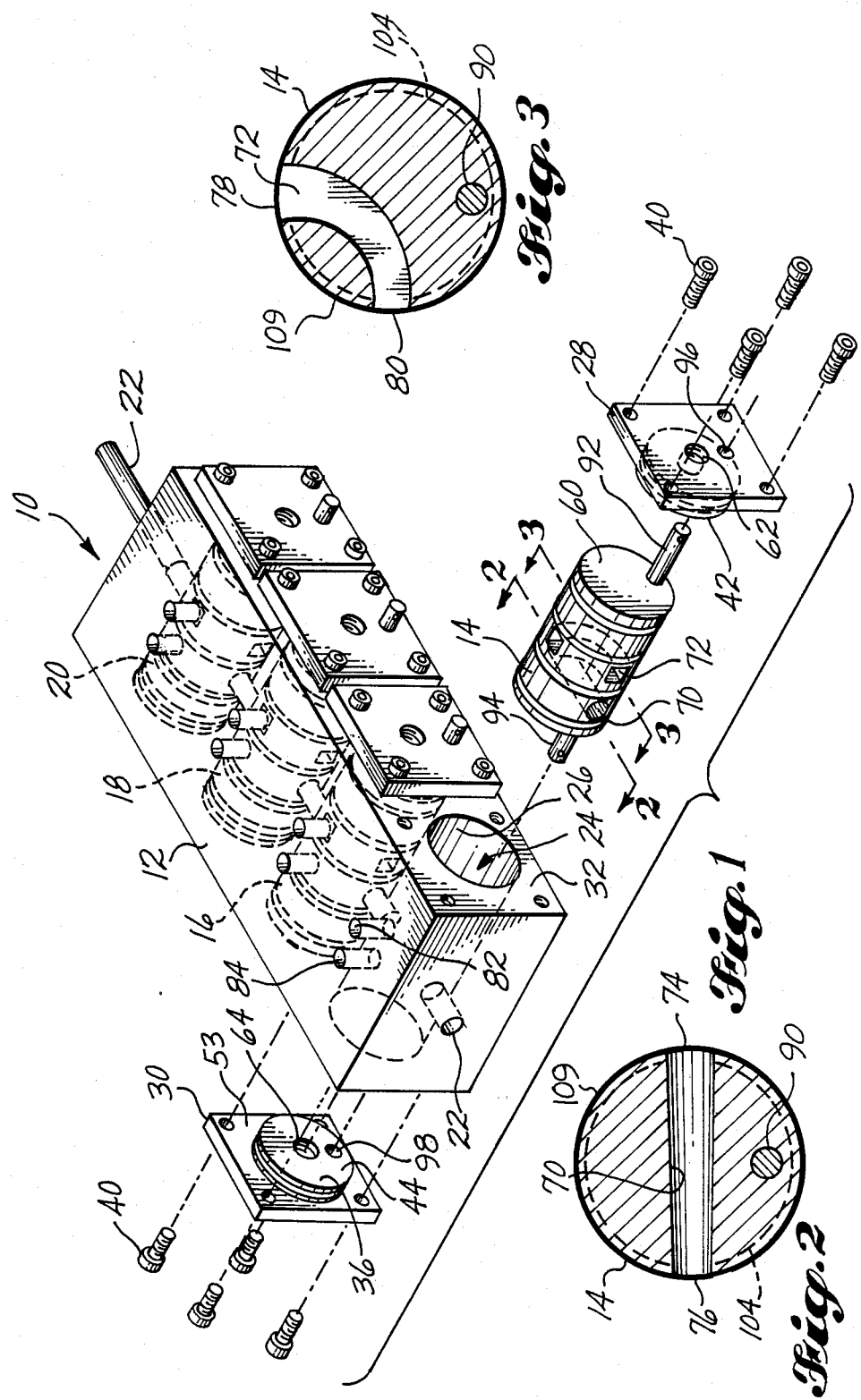

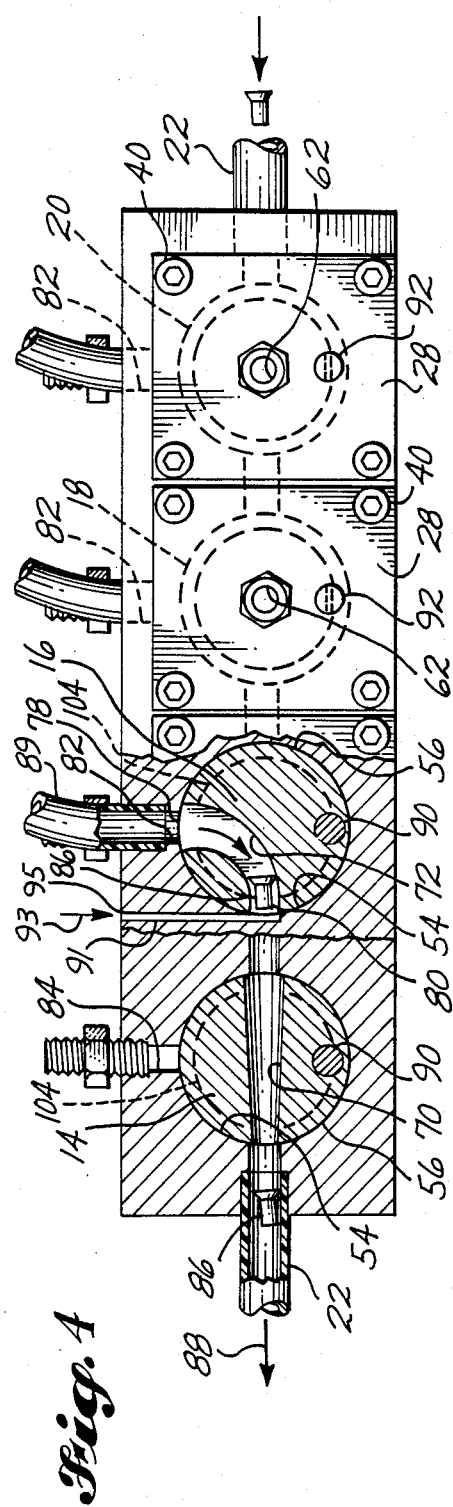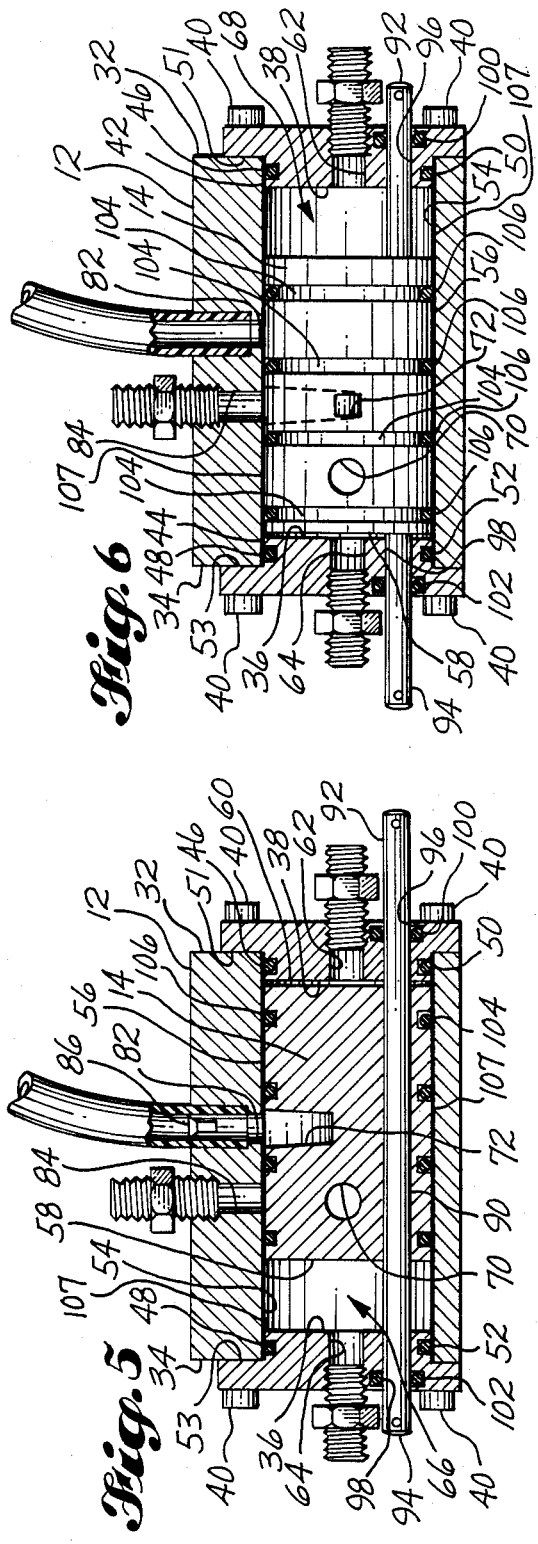

RIVET MANIFOLD FEED DEVICE

TECHNICAL FIELD

This invention relates to a device for feeding rivets from multiple passageways, which are supplied by rivet hoppers, into a common passageway, wherein the rivets are conveyed through the common passageway by a pressurized air stream. More particularly, the invention relates to such a device that delivers rivets into a common passageway at a position that is between upstream and downstream regions of that passageway, wherein the rivet is blasted downstream by an air stream.

BACKGROUND ART

This invention relates to a device that delivers or dispenses rivets into a rivet feed passageway for the purpose of conveying the rivets to a riveting machine. Many present day riveting machines are now automated to the point where it is important to have the capability to regularly feed rivets to the machine at a consistently rapid rate. In association with this, it is important to have the capability to rapidly feed rivets in situations where the size of the rivets must be constantly changed in accordance with the thickness of the members to be fastened together by the riveting machine.

The prior art contains many different devices for feeding rivets to a riveting machine. Many or most of these devices are quite satisfactory for their intended purpose. However, none provide the rivet feed rate, reliability, or versatility which is provided by the present invention. Of special pertinence is U.S. Pat. No. 4,208,153 issued to Trethewy on June 17, 1980. This feed device includes a plurality of feed members that deliver rivets into a rivet feed passageway. The device does not, however, have a separate air feed port for blasting a rivet through the feed passageway at the point where the rivet is delivered into the passageway.

Other U.S. patents known to be pertinent to the present invention are as follows: U.S. Pat. No. 3,030,832 issued to Flangeri et al on Apr. 24, 1962; U.S. Pat. No. 3,275,191 issued to MacDonald on Sept. 27, 1966; U.S. Pat. No. 3,334,785 issued to Grabowski et al on Aug. 8, 1967; U.S. Pat. No. 3,339,799 issued to Spisak on Sept. 5, 1967; U.S. Pat. No. 3,554,403 issued to Ginther on Jan. 12, 1971; U.S. Pat. No. 3,883,040 issued to Bell on May 13, 1975; and U.S. Pat. No. 3,993,216 issued to Poole on Nov. 23, 1976.

DISCLOSURE OF THE INVENTION

The present invention provides a rivet manifold feed device for delivering a rivet, or a plurality of rivets, into a rivet feed passageway. Normally, the passageway conveys rivets from an upstream region to a downstream region, wherein the rivets are conveyed through the passageway by a pressurized stream of air. Somewhere in the downstream region is a riveting machine, or other similar device, which utilizes the rivets for the purpose of fastening certain members together.

The device includes a body portion having a rivet feed passageway. The body portion includes at least one air feed port connected to a source of pressurized air, at least one rivet feed port, and at least one rivet feed member. The feed member may be received within the body portion and positioned so that it divides the rivet feed passageway into upstream and downstream portions. In preferred form, the feed member will be in the form of a cylindrical spool received within a cylindrical chamber in the manifold body portion. The outer sidewall of the feed member or spool is in sliding contact with the inner sidewall of the spool chamber. The spool is movable between first and second positions in the chamber, and the spool is in such position. Pressurized air is fed through the air feed port causing a rivet fed into the second passageway (when the spool was in the first position) to be blasted through the downstream portion of the rivet feed passageway and onward to a rivet machine.

The spool includes a guide member connected to and extending outwardly from each end of the spool, for guiding the spool as it reciprocates back and forth between the first and second positions. The guide member is connected to the spool in noncoaxial but parallel relationship to the longitudinal axis of the cylindrical spool. Outwardly extending ends of the guide member extend through bores in end sidewall portions of the spool chamber. The guide member guides the spool as it reciprocates back and forth between first and second positions, and prevents rotation of the spool in the spool chamber. It is important that the spool does not rotate so that the first and second spool passageway will properly register with the rivet feed passageway, and with the rivet feed and air feed ports, respectively, when the spool is in either the first or the second position.

The spool is reciprocated back and forth by means of a pressurized air supply that is fed into the spool chamber adjacent either end of the spool. An air supply port, connected to a pressurized source of air, may be provided in each end sidewall portion of the spool chamber that is adjacent each end of the spool. The flow of the air through each air supply port is controlled so that air flows only through one port at a time. Such air flow pushes against one end of the spool at a time, to in this manner move the spool back and forth between the first and second positions.

A lubricating material covers that portion of the outer sidewall of the spool which is in sliding contact with the inner sidewall of the spool chamber. In a similar manner, the inner sidewall of the spool chamber is also covered with a lubricating material. The lubricating material on each respective inner and outer sidewall reduces friction between the spool and the spool chamber as the spool moves back and forth between the first and second positions. The lubricating material may be in the form of Teflon, for example.

Positioned between the spool outer sidewall and the spool chamber inner sidewall is a sealing means for preventing leakage of pressurized air between the spool and the spool chamber. The sealing means comprises a plurality of annular grooves, each having a certain gland depth, and each being positioned around the cylindrical outer sidewall of the spool. A resilient annular seal is received within each annular groove. The seal is received so that the seal is in a condition of substantial hoop tension. The gland depth of each groove is sufficient so that the thickness of the seal is in a substantially noncompressed state when the spool is received in the spool chamber. This provides an important advantage in that as the spool moves back and forth in the chamber, the substantially noncompressed state of the resilient seal permits it to pass across upstream and downstream portions of the rivet feed passageway without extruding therein.

The guide member is positioned so that the outwardly extending ends of the guide member project from the ends of the spool at a position that is located radially inwardly from both the annular groove and the resilient seal received therein.

It should be appreciated that a plurality of spools may be received or housed within the body portion of the manifold. Properly controlling each spool would provide a means for delivering a variety of differently sized rivets into the rivet feed passageway. The spools may be operated so that they cooperate with each other in a manner so that downstream spools permit rivets to pass directly through the downstream spools and onward into the downstream portion of the rivet feed passageway when they are fed into the passageway by upstream spools.

An advantage to a rivet manifold feed device constructed in accordance with this invention is that it provides a feed device that is simple in construction, i.e., a multiplicity of spools may be mounted in a common manifold block, which further provides for the capability of handling a large number of rivets. Furthermore, a plurality of manifold blocks may be connected together in series if it is so desired.

Another important advantage of the present invention is that it provides fast delivery of a rivet down the rivet feed passageway. Pressurized air is fed directly into the second passageway of the spool to blast the rivet downstream at the point where the rivet is delivered into the rivet feed passageway. This permits the pressurized air to convey the rivet down the rivet feed passageway quickly and also results in a more efficient utilization of the feed air. Those prior art devices which utilize an air stream to convey a rivet downstream through a passageway also supply the pressurized air into the passageway at a point that is upstream from the point that the rivet is delivered into the passageway. This may result in a certain amount of air leakage caused by feed members positioned upstream from the rivet, a problem which is eliminated by the present invention.

Still another important advantage of the present invention is that it separates the function of delivering a rivet into a rivet feed passageway (escape of the rivet) from the function of blasting the rivet downstream from the passageway by means of pressurized air (rivet launch). In the aforementioned Trethewy patent, and in other known prior art devices, the escape and launch functions for rivet delivery are not separated. For example, one of the more common manifold feed devices currently in use is known as a Y-block feed device. The Y-block device receives a rivet directly from a rivet hopper and funnels the rivet into a common rivet feed passageway. The rivet is launched downstream through the passageway by pressurized air whose source may be substantially upstream from the location where the rivet is funneled into the passageway. The problem with this device is that the combined volume of each tube in the Y-block device causes an undesirable loss of air pressure in the passageway. The loss of air pressure means that the rivet will be slowed after launch downstream through the passageway. This is undesirable in an automatic riveting machine, which, to operate efficiently, must receive rivets quickly and in a consistent manner. Trethewy is much like the Y-block design from the standpoint that Trethewy delivers a rivet into a rivet feed passageway, wherein the source of pressurized air which blasts the rivet through the passageway may be located upstream of the point of delivery. Leakage through the feed members of Trethewy may substantially reduce the pressure of the air in the passageway as it travels downstream. This similarly slows down the speed of travel of the rivet. Separating escape and launch of the rivet in the manner provided by the present invention thus provides a means for delivering the rivet quickly through the passageway to the automatic riveting machine in a consistent manner.

These and other advantages of the present invention will become more apparent to the reader upon reading the remaining portions of this application.

BRIEF DESCRIPTION OF THE DRAWINGS

Referring now the drawings, like reference numerals refer to like parts throughout the various views, wherein:

FIG. 1 is an exploded pictorial view of a rivet manifold feed device constructed in accordance with a preferred embodiment of the present invention, and shows a plurality of rivet feed spools housed within a manifold body portion;

FIG. 2 is a side cross-sectional view of a rivet feed spool taken along line 2—2 in FIG. 1;

FIG. 3 is a side cross-sectional view of a rivet feed spool taken along line 3—3 in FIG. 1;

FIG. 4 is a side elevation of the device shown in FIG. 1, with the left-hand portion being shown in partial cross-sections, to show the transverse spool passageways in the rivet feed spools;

FIG. 5 is a cross-sectional view taken along the longitudinal axis of a rivet feed spool, and shows the spool in a first position in a spool chamber for receiving a rivet from a rivet feed port; and FIG. 6 is a side elevation of the rivet feed spool shown in FIG. 5, but shows the spool in a second position in the spool chamber for delivering a rivet into a rivet feed passageway.

BEST MODE FOR CARRYING OUT THE INVENTION

Referring now to the drawings, and first to FIG. 1, therein is shown at 10 a rivet manifold feed device constructed in accordance with a preferred embodiment of the present invention. The device 10 includes a manifold body portion 12 which houses a plurality of rivet feed members 14, 16, 18 and 20, and a rivet feed passageway 22. The rivet feed members 14, 16, 18, 20 are in the form of cylindrical spools which are received within cylindrical chambers, such as the chamber indicated generally by arrow 24 in the left hand portion of manifold body 12. The spool chamber 24 is defined by a bore 26, extending through the width of the manifold body 12, and by a pair of cover plates 28, 30 attached to each side 32, 34 (see FIGS. 4–6) of the manifold body 12. The cover plates 28, 30 provide end sidewalls 36, 38 on the inside of the spool chamber 24. The cover plates 28, 30 may be attached to the sides 32, 34 of the manifold body 12 by socket head cap screws 40, or by other suitable means.

Both cover plates 28, 30 include cylindrical portions 42, 44 that project inwardly into the spool chamber 24. Referring now to FIGS. 5 and 6, each of such portions 42, 44 have grooves 46, 48 in their outer radial perimeters. Positioned in grooves 46, 48 are circular resilient seals 50, 52. These seals 50, 52 prevent air leakage between the interface of the manifold body sides 32, 34 and inside surfaces 51, 53 of the cover plates 28, 30.

The inner cylindrical sidewall 54 of the spool chamber 24 is in sliding contact with the outer cylindrical sidewall 56 of the spool. The length of the spool chamber 24 is longer than that of the spool 14 to permit reciprocation of the spool back and forth in the spool chamber between first and second positions. For example, a first position of the spool 14 is shown in FIG. 5, and a second position of the spool 14 is shown in FIG. 6. The spool 14 is reciprocated back and forth by applying air pressure to either one of its ends 58, 60. Each cover plate 28, 30 is provided with an air supply port 62, 64 for this purpose. These ports 62, 64 are each connected to a source of pressurized air. The pressurized air is controlled appropriately for moving the spool 14 into either the first or second position. For example, if it is desired to move the spool into the first position, as shown in FIG. 5, pressurized air would be permitted to flow only through the air supply port 64 into the region indicated generally by arrow 66. If, on the other hand, it was desired to move the spool 14 into the second position, as shown in FIG. 6, then pressurized air would be permitted to flow only through the air supply port 62 into the region indicated generally by arrow 68. The means for controlling the airflow through the air supply ports 62, 64 is not shown or described herein, however.

Each spool, like the spool 14 shown in FIGS. 1–3, has a first passageway 70 (see FIG. 2), and a second passageway 72 (see FIG. 3). Referring now to FIG. 2, the first passageway 70 of spool 14 is a truncated conical bore extending transversely through the spool. It has first and second end openings 74, 76 that, when the spool is in the first position, register with upstream and downstream portions of the rivet feed pasageway 22 so that the first passageway 70 and the rivet feed passageway 22 form a single continuos rivet feed passageway. This permits rivets fed into the rivet feed passageway 22 upstream of the spool member 14 to pass through the spool 14 and onwardly downstream of the spool. The truncated conical bore 70 permits the jam-free passage of rivets through the feed passageway 22. Specifically, and in preferred form, the first end opening 74 is larger in diameter than the upstream portion of the rivet feed passageway 22 with which it registers. The diameter of the second end opening 76 is smaller than the diameter of the downstream portion of the rivet feed passageway 22 with which the second end opening similarly registers. The conical bore 70 should be constructed so that the radial difference between the end openings 74, 76 and their adjacent portions of the rivet feed passageway 22 is greater than the worst case accumlation of the tolerance of the device 10. This ensures that any rivet passing through the rivet passageway 22 will not encounter some sort of jamming surface or shoulder.

The second passageway 72, shown in FIG. 3, is a generally curved or "L" shaped passageway positioned transversely in the spool 14. The second passageway 72 has a first end opening 78, and a second end opening 80, and may also have a rectangular cross section which is easy to mill if the spool is assembled from two separate parts. The second passageway 72 is utilized for the purpose of storing a preloaded rivet and subsequently feeding that rivet into the rivet feed passageway 22.

The manifold body 12 includes a plurality of rivet feed ports 82, and a plurality of air feed ports 84. A separate rivet feed port 82 and a separate air feed port 84 is positioned adjacent each spool. Each rivet feed port 82 is connected to a rivet hopper, or similar device, which is not shown in the drawings. Each air feed port 84 is connected to a source of pressurized air. When the spool 14 is in the first position shown in FIG. 5, the first end opening 78 of the second passageway 72 registers with a rivet feed port 82. When in this position, a rivet 86 may be fed from a hopper into the second passageway 72. Furthermore, when in such position, the second end opening 80 is blocked by the inner sidewall 54 of the spool chamber 24. Therefore, the rivet 86 fed into the second passageway 72 remains therein until the spool 14 moves to the second position.

When the spool 14 is moved to the second position (FIG. 6), the first end opening 78 of the second passageway 72 registers with an air feed port 84, and the second end opening 80 registers with the downstream portion of the rivet feed passageway 22. Pressurized air delivered through the air feed port 84 blows the rivet 86 downstream through the rivet feed passageway.

In FIG. 4, the rivet 86 is shown being held in the second passageway 72 of the spool 16, with this spool being in the first position. When the spool 16 moves into the second position, air pressure delivered through the air feed port 84 blasts the rivet 86 out of the spool 16 downstream through the first passageway 70 of the spool 14. The rivet 86 is blasted further downstream through the rivet feed passageway 22 in the direction indicated by arrow 88. In a manner similar to the conically shaped first passageway 70, the second end opening 80 of the second passageway 72 is shaped so that the rivet 86 will not collide with a jamming surface or shoulder as it is blasted downstream.

In FIG. 4, the spool 14 would be in the first position, which is the same position as that which is shown in FIG. 5. When any of the spools 14, 16, 18, 20 are in the second position, the outer cylindrical sidewall 56 of each spool blocks the upstream portion of the rivet feed passageway 22 thereby preventing any rivets or airflow from being conveyed from the upstream part of the rivet feed passageway.

The device 10 may be adapted for use with currently existing automatic rivet feed hoppers so that when a rivet is fed into the feed passageway 22 from a particular spool a hopper may be signaled to deliver another rivet into the second or "L" shaped passageway 72. As shown in FIG. 4, this rivet 86 would drop by gravity through rivet feed port 82 by means of an inlet tube 89 when the spool 16 moves into the first position (as shown in FIG. 5). It is conceivable that more than one rivet could be delivered into the second passageway 72 at this time. Therefore, it is possible that a rivet may become jammed between the rivet feed port 82 and the first end opening 78 of the spool, thereby preventing the spool from moving back and forth between the first and second positions. Unjamming may be accomplished by directing a flow of pressurized air through a vent passageway 91 in the direction indicated by arrow 93. The vent passageway 91 connects the second end opening 80 of the second passageway 72 with the atmosphere. An operator could manually eject the rivets by first disconnecting the inlet tube 89, and then connecting a source of pressurized air to the opening 95 of the vent passageway 91. The rivets would then be blown upwardly and free of the device. The inlet tube 89 could then be reconnected and the device 10 would resume normal operation.

Each spool 14, 16, 18, 20 is provided with a guide member or rod 90 (see FIGS. 5 and 6) which has outwardly projecting ends 92, 94. The rod ends 92, 94 extend through bores 96, 98 in the cover plates 28, 30. Each bore 96, 98 is provided with a circular resilient seal 100, 102 which prevents air leakage from the spool chamber 24. The guide member 90 is in noncoaxial but parallel relationship to the longitudinal axis of symmetry of the cylindrical spool 14, and the guide member 90 is contained in the cylindrical spool 14 in the manner shown in FIG. 5. By having the ends 92, 94 of the guide member extend through the bores 96, 98 in the cover plates, the spool 14 is prevented from rotating in the spool chamber 24. This ensures that the first and second passageways 70, 72 will properly register with the rivet feed passageway 22, and the rivet feed and air feed ports 82, 84 when the spool reciprocates back and forth between the first and second positions.

A plurality of annular grooves 104 is provided in the outer radial perimeters of each spool 14, 16, 18, 20. These grooves 104 each receive a circular resilient seal 106 for the purpose of providing a seal against air leakage between the end regions 66, 68 of the spool chamber 24 and either the rivet and air feed ports 82, 84, or the first and second spool passageways 70, 72. The guide member 90 is positioned radially inwardly of the grooves 104, in the manner shown in FIGS. 5 and 6.

In preferred form, and referring specifically to spool 14 received within spool chamber 24, the outer sidewall 54 of the spool and the inner sidewall 56 of the spool chamber may each be coated with a layer of Teflon 109, 107. This permits smooth and dry lubricated sliding between the spool 14 and the spool chamber 24. It has been our discovery that the resilient seals 106 may be stretched when installed in their respective grooves in a manner so that they are maintained in tension (hoop tension) throughout their service in the device 10. In addition, the annular grooves 104 have a gland depth so that the resilient seals 106 are only slightly compressed when they are received therein. These two features, in combination, prevent the seals 106 from extruding into the rivet feed passageway 22 and being cut as the spools 14, 16, 18, 20 travel back and forth between the first and second positions. A person skilled in the art would realize that the installation of resilient seals, as just described, is different from the typical installation of such seals. By way of example, resilient seals received within annular grooves are usually installed so that they will not be stretched or in hoop tension when they are in the grooves, and further, they are installed so that their thickness will be compressed by approximately 20 to 30 percent of their diameters. To install a seal otherwise usually means that the seal will wear out quickly. In the present invention, however, it has been found that the Teflon coating 109, 107 on the outer sidewall 56 and the inner sidewall 54 of the spool 14 and the spool chamber 24, respectively, permits the seals 106 to be installed in the nontypical manner described above.

As can be seen from the drawings, the rivet feed passageway 22 extends through the entire length of the manifold body 12. Rivets may be delivered into the rivet feed passageway 22 at any of the positions where the spools 14, 16, 18, or 20 are located. It is also possible that a rivet may be placed into the rivet feed passageway upstream of the manifold device 10. This could be accomplished, for example, either by another manifold device 10, or by a rivet machine operater manually placing a rivet upstream into the rivet feed passageway 22. In either case, a source of pressurized air in the upstream region would convey the rivet downstream.

The description of the invention provided herein is to be used only for illustrative purposes and not for limiting the scope of patent coverage. Patent coverage is to be limited only by the appended claims which follow, in accordance with established doctrines of patent claim interpretation.

What is claimed is:

1. A rivet feed apparatus, comprising:
    a body portion receiving a rivet feed passageway, said feed passageway connecting an upstream region to a downstream region and through which a rivet may be propelled from said upstream region into said downstream region by an airflow, both of said regions being external of said body portion, said body portion including at least one separate air feed port connected to a source of pressurized air, and at least one rivet feed port;
    at least one rivet feed member received within said body portion and positioned in said rivet feed passageway so as to divide said passageway into upstream and downstream sections, said feed member being movable between first and second positions, and having a first passageway and a second passageway, said feed member having an outer sidewall that is in sliding contact with an inner sidewall of said body portion, and wherein
    said first passageway includes first and second end openings, said end openings being positioned in said feed member so that said first end opening registers with said upstream section of said rivet feed passageway, and said second end opening registers with said downstream section of said rivet feed passageway, such registration occuring only when said feed member is in said first position, to permit a rivet propelled from said upstream region to pass through said member and onward to said downstream region, and with said second passageway including first and second end openings, said rivet feed port being positioned in said body portion adjacent said feed member in a manner so that said first end opening of said second passageway registers with said rivet feed port only when said feed member is in said first position, and when in such position, said second end opening of said second passageway is positioned in said feed member in a manner so that such second end opening is blocked by said inner sidewall of said body portion, so that a rivet may be fed through said rivet feed port into said second passageway and remain therein while said feed member is in said first position, and further,
    said second end opening of said second passageway also being positioned in said feed member so that such second opening registers with said downstream section when said feed member is in said second position, wherein said outer sidewall of said feed member blocks said upstream section when said feed member is in such position, and with said air feed port being positioned adjacent said feed member so that said first end opening of said second passageway registers with said air feed port when said feed member is in such position, said air feed port causing said rivet fed into said second passageway when said feed member was in said first position to be blasted downstream through said rivet feed passageway.

2. The apparatus of claim 2, wherein each feed member comprises a cylindrical spool slidably received within a cylindrical spool chamber in said body portion.

3. The apparatus of claim 2, wherein said first end opening of said first passageway is positioned in straight line relationship with said second end opening of said first passageway, and wherein said first end opening of said second passageway is positioned in nonstraight line relationship with respect to said second end opening of said second passageway.

4. The apparatus of claim 2, including a guide member connected to and extending outwardly from an end of said feed member spool, said guide member being in noncoaxial but parallel relationship with the longitudinal axis of said spool, with said guide member extending through a bore in an end sidewall portion of said spool chamber, to prevent rotation of said spool in said spool chamber so that said first and second passageways in said spool register with said rivet feed passageway, and register with said rivet feed and air feed ports, respectively, when said spool is in said first and second positions.

5. The apparatus of claim 4, including air supply means for reciprocating said spool back and forth between said first and second positions.

6. The apparatus of claim 5, wherein said air supply means includes an end sidewall of said spool chamber adjacent each end of said spool, and an air supply port in each of said sidewalls, with each air supply port being connected to a source of pressurized air.

7. The apparatus of claim 6, including a plurality of feed member spools positioned in series in said passageway, and a plurality of air feed ports, and a plurality of rivet feed ports, wherein a separate air feed port and a separate rivet feed port is positioned adjacent each spool, so that each spool may deliver a separate rivet into said rivet feed passageway.

8. The apparatus of claim 1, including
a dry lubricating material covering that portion of said outer sidewall that is in sliding contact with said inner sidewall, and another lubricating material covering that portion of said inner sidewall that is in sliding contact with said outer sidewall, to reduce friction between said feed member and said body portion when said feed member moves between said first and second positions.

9. The rivet feed apparatus of claim 8, including sealing means, positioned between said outer sidewall and said inner sidewall, for preventing leakage of pressurized air between said outer and inner sidewalls.

10. The apparatus of claim 9, wherein said feed member comprises a cylindrical spool slidably received within a cylindrical spool chamber in said body portion, and wherein said sealing means comprises at least one annular groove having a certain gland depth, said groove being positioned around said cylindrical outer sidewall, and a resilient annular seal received within said annular groove, and said gland depth having a depth so that the thickness of said seal is in a substantially noncompressed state when said feed member is received in said body portion.

11. The apparatus of claim 10, wherein said lubricating material covering both said inner and outer sidewalls comprises Teflon.

12. The apparatus of claim 10, including an elongated guide member having a longitudinal axis in noncoaxial but parallel relationship with the longitudinal axis of said feed member spool, said guide member being connected to said spool in a manner so that said spool is guided in a nonrotating manner back and forth along said longitudinal axis of said guide member as said spool moves between said first and second positions.

13. The apparatus of claim 12, wherein said guide member includes a projecting end portion connected to and extending outwardly from an end of said feed member spool, said end extending through an opening in an end sidewall portion of said spool chamber, to prevent rotation of said spool and said spool chamber.

14. The apparatus of claim 13, wherein said guide member projects outwardly from said end of said feed member spool at a position that is radially inwardly of the gland depth of said groove.

15. A rivet feed apparatus, comprising:
a body portion through which extends a rivet feed passageway for delivering rivets from an upstream region to a downstream region, wherein said rivets are normally propelled through said passageway by air pressure from an upstream air pressure source, said body portion having at least one cylindrical chamber transversely intersecting said passageway into upstream and downstream sections, and separate rivet and air feed ports positioned in an upper sidewall portion of said body portion, said ports respectively providing passageways for delivering rivets and pressurized airflow to said chamber, and
a cylindrical feed spool slidably received within said chamber and intersecting said rivet feed passageway, said spool being movable between first and second positions, and further, said spool having a first passageway and a second passageway, and wherein
said first passageway extends diametrically through said spool and has end openings that register with said upstream and downstream sections of said rivet feed passageway when said spool is in said first position, in a manner so as to permit a rivet traveling through said rivet feed passageway from said upstream region to pass through said spool and onward downstream, and wherein
said second passageway has first and second end openings positioned in said spool so that said first end opening registers with said rivet feed port when said spool is in said first position, to permit a rivet to be dropped through said rivet feed port into said second passageway, and said second opening is blocked by the inner side wall of said chamber so that the rivet is held in said second passageway, and still further,
when said spool is moved to said second position said first and second openings of said second passageway are positioned in said spool in a manner so that said first opening registers with said air feed port and said second opening registers with said downstream section of said rivet feed passageway, to permit pressurized airflow from said air feed port to blast said rivet downstream through said rivet feed passageway.

16. The apparatus of claim 15, wherein said first passageway in said spool is a straight bore diametrically extending through said spool member, and wherein said second passageway therein is a generally "L" shaped passageway, with said first opening of said second passageway being positioned on the outer surface of said spool approximately 90° relative to said second opening.

17. The apparatus of claim 15, including a plurality of cylindrical chambers positioned in series in said body portion, each chamber transversely intersecting said rivet feed passageway, and with a cylindrical feed spool being slidably received in each chamber, and wherein a plurality of rivet feed ports and a plurality of air feed ports are positioned in said upper sidewall portion of said body portion, one separate rivet feed port and one separate air feed port being positioned adjacent each chamber, respectively, for providing passageways for delivering rivets and pressurized airflow to said chambers, wherein each spool is movable between first and second positions, and with each spool having a first passageway and a second passageway, said first passageway of each spool extending diametrically through said spool and having end openings that register with said rivet feed passageway when said spool is in said first position, and wherein said first passageways of all of said spools and said rivet feed passageway form a single continuous rivet feed passageway when all of said spools are in said first position, in a manner so as to permit a rivet traveling through said rivet feed passageway from said upstream region to pass through said plurality of spools and onward downstream, and wherein said second passageway of each spool includes first and second end openings positioned in each spool so that said first end opening registers with the rivet feed port which is adjacent each spool when said spool is in said first position, to permit a rivet to be dropped through said rivet feed port into said second passageway, and in such first position, said second opening is blocked by the inner side wall of said chamber in which said spool is received, so that the rivet is held in said second passageway, and still further, when each spool is moved to said second position said first and second openings of said second passageway are positioned in each spool in a manner so that said first opening registers with said respective air feed port adjacent said spool's chamber, and said second opening registers with said rivet feed passageway, to permit pressurized airflow from said respective air feed port to blast said rivet downstream through said rivet feed passageway.

18. The apparatus of claim 15, wherein a dry lubricating material substantially covers said chamber's inner sidewall and said spool's outer sidewall.

19. The apparatus of claim 15, including a guide member connected to and extending outwardly from an end of said spool, said guide member being in non-coaxial but parallel relationship with the longitudinal axis of said spool, with said guide member extending through a bore in an end sidewall portion of said chamber, to prevent rotation of said spool in said chamber when said spool moves between said first and second positions.

20. The apparatus of claim 19, including air supply means for reciprocating said spool back and forth between said first and second positions.

21. The apparatus according to claim 20, wherein said air supply means comprises a separate air supply port positioned in each end sidewall of said chamber, with each air supply port being connected to a source of pressurized air.

22. The apparatus of claim 15, including sealing means for preventing leakage of pressurized air between the outer sidewall of said spool and the inner sidewall of said chamber.

23. The apparatus of claim 22, wherein said sealing means comprises at least one annular groove around the outer sidewall of said spool, said groove having a certain gland depth, and a resilient annular seal received within said groove.

24. The apparatus of claim 23, including a plurality of annular grooves each having a resilient seal received therein, with one groove and seal being positioned adjacent each end of said spool, and with one groove and seal being positioned adjacent but outwardly of said second passageway in said spool, and with still another groove and seal being positioned between said first and second passageways.

\* \* \* \* \*

UNITED STATES PATENT AND TRADEMARK OFFICE
CERTIFICATE OF CORRECTION

PATENT NO. : 4,830,547
DATED : May 16, 1989
INVENTOR(S) : Douglas L. Boob and David L. Wagner It is certified that error appears in the above-identified patent and that said Letters Patent is hereby corrected as shown below:

On the front page, the inventor "Douglas J. Boob" should be
-- Douglas L. Boob --; and under the section entitled,
"References Cited", "Filageri" should be -- Filangeri --.

Col. 5, line 33, "continuos" should be -- continuous --.
Col. 5, line 48, "accumlation" should be -- accumulation --.
Claim 2, col. 8, line 64, "Claim 2" should be -- Claim 1 --.
Claim 4, col. 9, line 7, delete "90".

Signed and Sealed this

Twenty-seventh Day of February, 1990

Attest:

JEFFREY M. SAMUELS

Attesting Officer     Acting Commissioner of Patents and Trademarks